United States Patent
Zhu et al.

(10) Patent No.: US 12,436,165 B2
(45) Date of Patent: Oct. 7, 2025

(54) METHOD AND DEVICE FOR MEASURING FLUID IN TARGET PIPELINE

(71) Applicant: Tsinghua University, Beijing (CN)

(72) Inventors: Yinhai Zhu, Beijing (CN); Peixue Jiang, Beijing (CN); Yusen Wang, Beijing (CN)

(73) Assignee: Tsinghua University, Haidian District (CN)

( * ) Notice: Subject to any disclaimer, the term of this patent is extended or adjusted under 35 U.S.C. 154(b) by 390 days.

(21) Appl. No.: 18/193,383

(22) Filed: Mar. 30, 2023

(65) Prior Publication Data

US 2023/0349943 A1    Nov. 2, 2023

(30) Foreign Application Priority Data

Apr. 1, 2022 (CN) .......................... 202210339897.5

(51) Int. Cl.
| | |
|---|---|
| G01P 5/00 | (2006.01) |
| G01P 5/14 | (2006.01) |
| G01P 5/20 | (2006.01) |
| G01P 5/26 | (2006.01) |
| G06T 5/70 | (2024.01) |
| G06T 7/246 | (2017.01) |

(52) U.S. Cl.
CPC ................ *G01P 5/26* (2013.01); *G01P 5/001* (2013.01); *G01P 5/14* (2013.01); *G01P 5/20* (2013.01); *G06T 5/70* (2024.01); *G06T 7/246* (2017.01)

(58) Field of Classification Search
CPC .... G01P 5/26; G01P 5/001; G01P 5/14; G01P 5/20; G06T 5/70; G06T 7/0002; G06T 7/246; G06T 2207/10016
See application file for complete search history.

(56) References Cited

U.S. PATENT DOCUMENTS

| | | | |
|---|---|---|---|
| 2008/0092666 A1* | 4/2008 | Flaten | G01F 22/00 |
| | | | 73/861.07 |
| 2014/0002617 A1* | 1/2014 | Zhang | H04N 13/243 |
| | | | 348/48 |
| 2020/0182671 A1* | 6/2020 | Wilke | G01F 1/7086 |

* cited by examiner

Primary Examiner — Jennifer D Bennett
(74) Attorney, Agent, or Firm — Foley & Lardner LLP

(57) ABSTRACT

This application discloses a fluid measuring method and device and electronic equipment. When a fluid flows in a target pipeline, high-speed cameras obtain a first sampling image set of a tracer particle cluster in the fluid passing a front end of the target pipeline and a second sampling image set of the tracer particle cluster passing a rear end of the target pipeline, thereby obtaining passing time distribution information of the tracer particle cluster passing through the target pipeline. A mean residence time of the fluid in the high-pressure target pipeline is obtained based on the passing time distribution information. In this way, the accuracy of non-intrusive online measurement of the mean residence time of the supercritical pressure fluid in the pipeline is improved.

16 Claims, 13 Drawing Sheets (a)

(b)

(c)

METHOD AND DEVICE FOR MEASURING FLUID IN TARGET PIPELINE

CROSS REFERENCE TO RELATED APPLICATION

This patent application claims the benefit and priority of Chinese Patent Application No. 202210339897.5, filed with the China National Intellectual Property Administration on Apr. 1, 2022, the disclosure of which is incorporated by reference herein in its entirety as part of the present application.

TECHNICAL FIELD

This application relates to the technical field of fluid residence time research, and in particular, to a fluid measuring method and device and electronic equipment.

BACKGROUND

The flow, convective heat transfer and chemical reaction of the supercritical pressure fluid in the pipeline are widely applied in aerospace, energy chemical and other fields. The mechanism study of the flow, convective heat transfer and chemical reaction of the supercritical pressure fluid in the pipeline or reactor is a prerequisite for the development of related technologies, and the mean residence time of the supercritical pressure fluid in the pipeline is an important basis for related research. However, currently, measurement of the mean residence time of the supercritical pressure fluid in the pipeline has low accuracy.

SUMMARY

Embodiments of this application provide a fluid measuring method and device and electronic equipment, to improve measurement accuracy of a mean residence time of a supercritical pressure fluid in a pipeline.

According to a first aspect, an embodiment of this application provides a fluid measuring method. The method includes:
  obtaining, when a fluid flows in a target pipeline, a first sampling image set of a tracer particle cluster in the fluid passing a front end of the target pipeline and a second sampling image set of the tracer particle cluster passing a rear end of the target pipeline;
  obtaining, based on the first sampling image set and the second sampling image set, passing time distribution information of the tracer particle cluster passing through the target pipeline; and
  obtaining a mean residence time of the fluid in the high pressure target pipeline based on the passing time distribution information.

In an example, before the obtaining a first sampling image set of a tracer particle cluster in the fluid passing a front end of the target pipeline and a second sampling image set of the tracer particle cluster passing a rear end of the target pipeline, the method may further include:
  obtaining a working medium temperature and a working medium pressure of the fluid at the front end and/or the rear end of the target pipeline;
  determining a target laser incidence mode in a plurality of laser incidence modes based on the working medium temperature and the working medium pressure, where a laser has different incidence angles in different laser incidence modes; and
  controlling the laser to emit a laser light based on the target laser incidence mode, where
  images in the first sampling image set and the second sampling image set are images obtained when the laser excites the tracer particle cluster to scatter.

In an example, the determining a target laser incidence mode in a plurality of laser incidence modes based on the working medium temperature and the working medium pressure may include:
  determining that the target laser incidence mode is a laser normal incidence mode when the working medium temperature satisfies a pseudo-critical temperature corresponding to the working medium pressure, where an incidence direction of the laser in the laser normal incidence mode is perpendicular to a central axis of the target pipeline; or
  determining that the target laser incidence mode is a laser oblique incidence mode when the working medium temperature does not satisfy a pseudo-critical temperature corresponding to the working medium pressure, where an incidence direction of the laser in the laser oblique incidence mode has an inclination angle with a central axis of the target pipeline.

In an example, when the target laser incidence mode is the laser normal incidence mode,
  the obtaining, based on the first sampling image set and the second sampling image set, passing time distribution information of the tracer particle cluster passing through the target pipeline may include:
  applying optical distortion correction to the images in the first sampling image set and the second sampling image set to obtain a first corrected particle image set and a second corrected particle image set; and
  obtaining, based on the first corrected particle image set and the second corrected particle image set, the passing time distribution information of the tracer particle cluster passing through the target pipeline.

In an example, the applying optical distortion correction to the images in the first sampling image set and the second sampling image set to obtain a first corrected particle image set and a second corrected particle image set may include:
  obtaining a diameter of the target pipeline, a half-width of a sampling cross-section, distances between all tracer particle images and the central axis of the target pipeline, and a thickness of the laser light emitted by the laser; and
  applying optical distortion correction to the images in the first sampling image set and the second sampling image set based on the diameter, the half-width, the distances and the thickness of the laser light, to obtain the first corrected particle image set and the second corrected particle image set.

In an example, before the obtaining, based on the first sampling image set and the second sampling image set, passing time distribution information of the tracer particle cluster passing through the target pipeline, the method may further include:
  processing the images in the first sampling image set and the second sampling image set to obtain a first preprocessed particle image set and a second pre-processed particle image set; and
  the obtaining, based on the first sampling image set and the second sampling image set, passing time distribution information of the tracer particle cluster passing through the target pipeline may include:
  obtaining, based on the first pre-processed particle image set and the second pre-processed particle image set, the passing time distribution information of the tracer particle cluster passing through the target pipeline.

In an example, the processing the images in the first sampling image set and the second sampling image set to obtain a first pre-processed particle image set and a second pre-processed particle image set may include:

performing boundary removal on the images in the first sampling image set and the second sampling image set to obtain a first boundary-removed particle image set and a second boundary-removed particle image set;

performing noise reduction on the images in the first boundary-removed particle image set and the second boundary-removed particle image set to obtain a first noise-reduced particle image set and a second noise-reduced particle image set; and binarizing the images in the first noise-reduced particle image set and the second noise-reduced particle image set to obtain the first pre-processed particle image set and the second pre-processed particle image set.

In an example, after the binarizing the images in the first noise-reduced particle image set and the second noise-reduced particle image set to obtain the first pre-processed particle image set and the second pre-processed particle image set, the method may further include:

obtaining a mechanical oscillation period of the first pre-processed particle image set and the second pre-processed particle image set; and smoothing the first pre-processed particle image set and the second pre-processed particle image set based on the mechanical oscillation period to obtain a first smoothed particle image set and a second smoothed particle image set.

In an example, the obtaining a mean residence time of the fluid in the high pressure target pipeline based on the passing time distribution information may include:

obtaining a first mean passing moment of the front end of the target pipeline based on the passing time distribution information;

obtaining a second mean passing moment of the rear end of the target pipeline based on the passing time distribution information; and calculating the mean residence time based on the first mean passing moment and the second mean passing moment.

According to a second aspect, an embodiment of this application provides a fluid measuring device, including:

an image sampling module configured to obtain, when a fluid flows in a target pipeline, a first sampling image set of a tracer particle cluster in the fluid passing a front end of the target pipeline and a second sampling image set of the tracer particle cluster passing a rear end of the target pipeline;

a time distribution module configured to obtain, based on the first sampling image set and the second sampling image set, passing time distribution information of the tracer particle cluster passing through the target pipeline; and a time calculation module configured to obtain a mean residence time of the fluid in the high pressure target pipeline based on the passing time distribution information.

In an example, the device may further include:

a laser incidence control module configured to obtain a working medium temperature and a working medium pressure of the fluid at the front end and/or rear end of the target pipeline, where the laser incidence control module is further configured to determine a target laser incidence mode in a plurality of laser incidence modes based on the working medium temperature and the working medium pressure, where a laser has different incidence angles in different laser incidence modes; and the laser incidence control module is further configured to control the laser to emit a laser light based on the target laser incidence mode, where images in the first sampling image set and the second sampling image set are images obtained when the laser excites the tracer particle cluster to scatter.

In an embodiment, the laser incidence control module is specifically configured to:

determine that the target laser incidence mode is a laser normal incidence mode when the working medium temperature satisfies a pseudo-critical temperature corresponding to the working medium pressure, where an incidence direction of the laser in the laser normal incidence mode is perpendicular to a central axis of the target pipeline; or determine that the target laser incidence mode is a laser oblique incidence mode when the working medium temperature does not satisfy a pseudo-critical temperature corresponding to the working medium pressure, where an incidence direction of the laser in the laser oblique incidence mode has an inclination angle with a central axis of the target pipeline.

In an example, when the target laser incidence mode is the laser normal incidence mode, the time distribution module may include:

an optical distortion correction unit configured to apply optical distortion correction to the images in the first sampling image set and the second sampling image set to obtain a first corrected particle image set and a second corrected particle image set; and a time distribution unit configured to obtain, based on the first corrected particle image set and the second corrected particle image set, the passing time distribution information of the tracer particle cluster passing through the target pipeline.

In an example, the optical distortion correction unit may include:

an acquisition subunit configured to obtain a diameter of the target pipeline, a half-width of a sampling cross-section, distances between all tracer particle images and the central axis of the target pipeline, and a thickness of the laser light emitted by the laser; and a correction subunit configured to apply optical distortion correction to the images in the first sampling image set and the second sampling image set based on the diameter, the half-width, the distances and the thickness of the laser light, to obtain the first corrected particle image set and the second corrected particle image set.

In an example, the device may further include:

an image processing module configured to process images in the first sampling image set and the second sampling image set to obtain a first pre-processed particle image set and a second pre-processed particle image set, where the time distribution module is further configured to obtain, based on the first pre-processed particle image set and the second pre-processed particle image set, the passing time distribution information of the tracer particle cluster passing through the target pipeline.

In an example, the image processing module may include:
a boundary removal unit configured to perform boundary removal on the images in the first sampling image set and the second sampling image set to obtain a first boundary-removed particle image set and a second boundary-removed particle image set;
a noise reduction unit configured to perform noise reduction on the images in the first boundary-removed particle image set and the second boundary-removed particle image set to obtain a first noise-reduced particle image set and a second noise-reduced particle image set; and
a binarization unit configured to binarize the images in the first noise-reduced particle image set and the second noise-reduced particle image set to obtain the first pre-processed particle image set and the second pre-processed particle image set.

In an example, the device may further include:
a smoothing processing module configured to obtain a mechanical oscillation period of the first pre-processed particle image set and the second pre-processed particle image set, where
the smoothing processing module may be further configured to smooth the first pre-processed particle image set and the second pre-processed particle image set based on the mechanical oscillation period to obtain a first smoothed particle image set and a second smoothed particle image set.

In an example, the time calculation module may be further configured to obtain a first mean passing moment of the front end of the target pipeline based on the passing time distribution information;
the time calculation module may be further configured to obtain a second mean passing moment of the rear end of the target pipeline based on the passing time distribution information; and
the time calculation module may be further configured to calculate the mean residence time based on the first mean passing moment and the second mean passing moment.

According to a third aspect, an embodiment of this application provides electronic equipment, including a processor and a memory storing computer program instructions. The processor executes the computer program instructions to perform the steps in the fluid measuring method according to any of the above examples.

According to a fourth aspect, an embodiment of this application provides a computer-readable storage medium. The computer-readable storage medium stores computer program instructions, and a processor executes the computer program instructions to perform the steps in the fluid measuring method according to any of the above examples.

According to a fifth aspect, an embodiment of this application provides a computer program product. When instructions in the computer program product are executed by a processor of electronic equipment, the electronic equipment performs the steps in the fluid measuring method according to any of the above examples.

In conclusion, the embodiments of this application disclose a fluid measuring method and device and electronic equipment. When a fluid flows in a target pipeline, high-speed cameras obtain a first sampling image set of a tracer particle cluster in the fluid passing a front end of the target pipeline and a second sampling image set of the tracer particle cluster passing a rear end of the target pipeline, thereby obtaining passing time distribution information of the tracer particle cluster passing through the target pipeline. A mean residence time of the fluid in the high-pressure target pipeline is obtained based on the passing time distribution information. In this way, the accuracy of non-intrusive online measurement of the mean residence time of the supercritical pressure fluid in the pipeline is improved.

BRIEF DESCRIPTION OF THE DRAWINGS

To describe the technical solutions in the embodiments of this application, the following briefly describes the accompanying drawings required for the embodiments. A person of ordinary skill in the art may still derive other accompanying drawings from these accompanying drawings without creative efforts.

DETAILED DESCRIPTION OF THE EMBODIMENTS

Features of various aspects and exemplary embodiments of this application are described below in detail. To make the objectives, technical solutions, and advantages of this application clearer, this application is further described in detail below with reference to the accompanying drawings and embodiments. It should be understood that the embodiments described herein are merely used to explain this application, rather than to limit this application. A person skilled in the art can implement this application without some of these specific details. The following description of the embodiments is intended only to provide a better understanding of this application by illustrating examples of this application.

It should be noted that relational terms herein such as first and second are merely used to distinguish one entity or operation from another entity or operation without necessarily requiring or implying any actual such relationship or order between such entities or operations. In addition, terms "include", "comprise", or any other variations thereof are intended to cover a non-exclusive inclusion, so that a process, a method, an article, or a device including a series of elements not only includes those elements, but also includes other elements that are not explicitly listed, or also includes inherent elements of the process, the method, the article, or the device. Without more restrictions, the elements defined by the sentence "including . . . " do not exclude the existence of other identical elements in a process, method, article, or device including the elements.

In the pipeline, thermal properties of the supercritical pressure fluid may increase or decrease dramatically with changes in the fluid temperature, and changes in components and energy source terms caused by chemical reactions also exacerbate the changes in thermal properties. In fields such as aerospace, the supercritical pressure fluid needs to work under extreme conditions such as high temperature and high pressure. These characteristics make it difficult to obtain an accurate mean residence time of the supercritical pressure fluid. Conventional methods for studying fluid residence time may include theoretical calculations and experimental studies. Theoretical calculations can hardly control errors in calculating the properties of the continuously changing complex mixture, and may not be used in complex mixtures; while existing experimental studies cannot achieve non-intrusive measurement of the fluid with drastically changing properties or under extreme conditions, and cannot reflect the overall information of the flow field and lack visualization information.

To resolve the prior-art problems, the embodiments of this application provide a fluid measuring method and device, electronic equipment, a computer readable storage medium, and a computer program product. The fluid measuring method according to the embodiments of this application is first described below.

Figure 1:
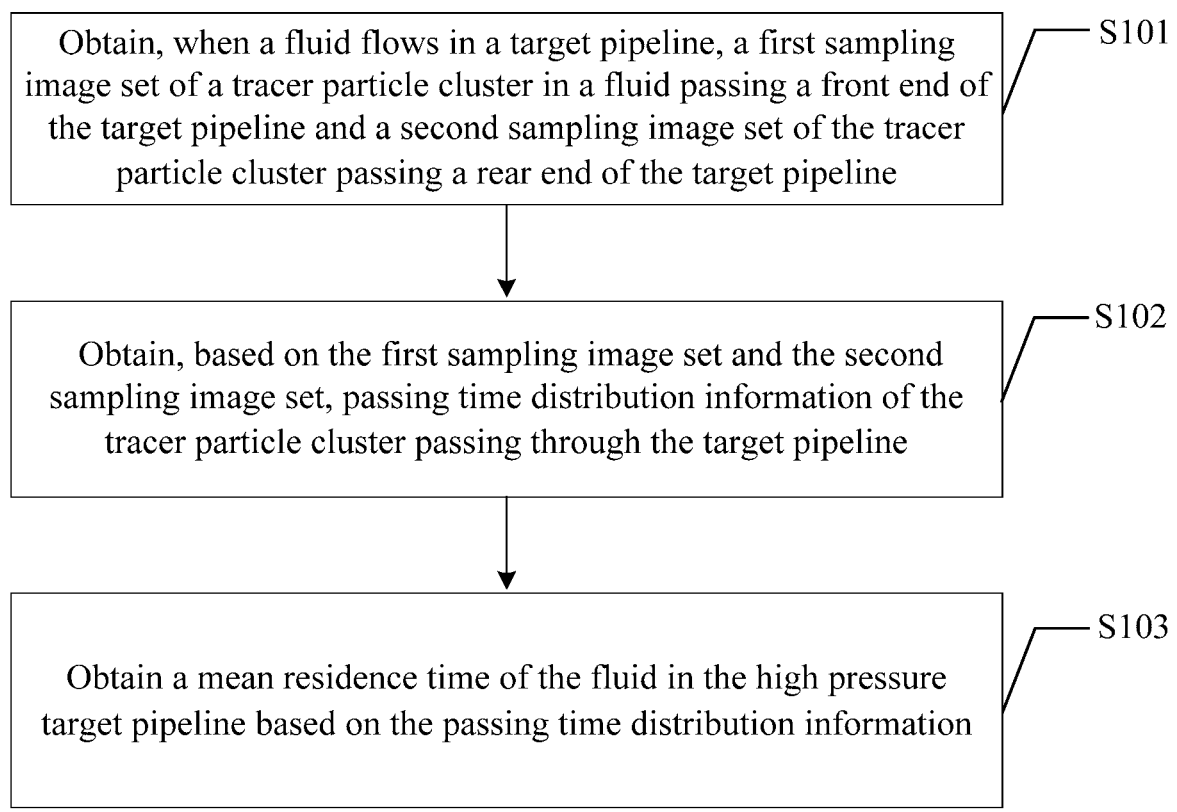
FIG. 1 is a schematic flowchart of a fluid measuring method according to an embodiment of this application.
Figure 2:
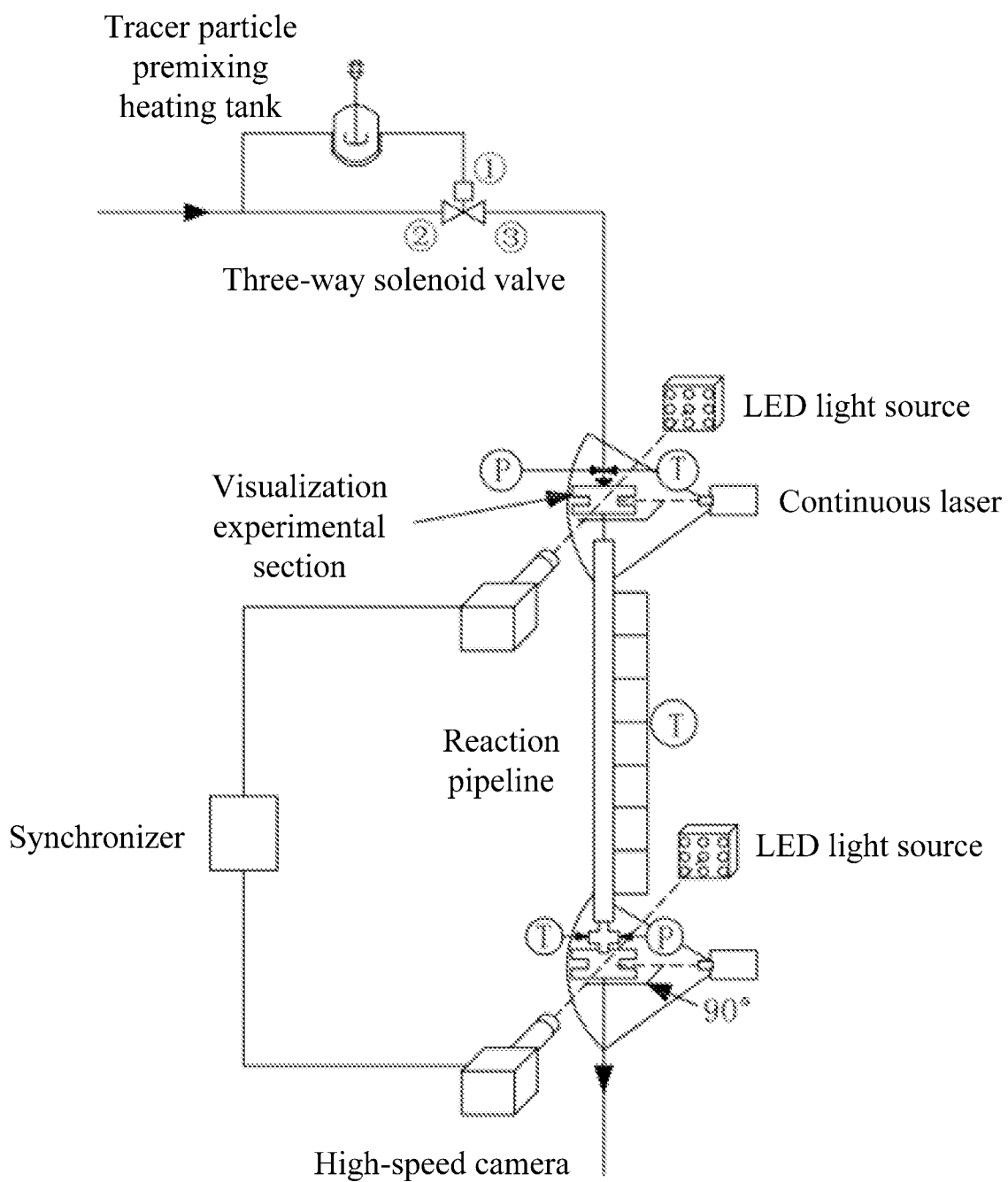
FIG. 2 is a schematic structural diagram of an experimental system of a fluid measuring method according to an embodiment of this application.

FIG. 1 is a schematic flowchart of a fluid measuring method according to an embodiment of this application. The method includes steps S101 to S103.

S101: Obtain, when a fluid flows in a target pipeline, a first sampling image set of a tracer particle cluster in a fluid passing a front end of the target pipeline and a second sampling image set of the tracer particle cluster passing a rear end of the target pipeline.

In the step S101, the fluid is a form of object corresponding to solid, a general term for liquid and gas, and is composed of a large number of molecules that are constantly in thermal motion and have no fixed equilibrium position. Basic characteristics are that the fluid does not have a shape and has mobility.

It should be noted that the fluid may be a fluid at any pressure, and specifically, may be a supercritical pressure fluid.

The target pipeline may be a reaction line, and specifically, may be a high pressure reaction pipeline.

The tracer particle cluster includes at least one tracer particle, the tracer particle may be selected based on a working medium temperature and pressure of the measured fluid. Specifically, the silicon dioxide (SiO2) micronsphere may be selected as the tracer particle. Certainly, the tracer particle is not limited to SiO2 micronsphere, and may be other tracer particles that are resistant to the pressure corresponding to the working medium temperature of the measured fluid.

The obtaining a first sampling image set of a tracer particle in the fluid passing a front end of the target pipeline may include: The electronic equipment controls a high-speed camera acquisition device to capture at least one image of the tracer particle cluster passing the front end of the target pipeline and form the first sampling image set. The high-speed camera acquisition device is disposed at the front end of the reaction pipeline.

Similarly, the obtaining a second sampling image set of the tracer particle in the fluid passing a rear end of the target pipeline may include: The electronic equipment controls a high-speed camera acquisition device to capture at least one image of the tracer particle cluster passing the rear end of the target pipeline and form the second sampling image set. The high-speed camera acquisition device is disposed at the rear end of the reaction pipeline.

For example, FIG. 2 and FIGS. 3A-C show an experimental system in an embodiment of the fluid measuring method. The system includes a tracer particle premixing heating tank, a three-way solenoid valve, a reaction pipeline (that is, the target pipeline), a visualization experimental section, a continuous laser, an LED light source, a high-speed camera, a synchronizer, a temperature detection component, and a pressure detection component.

Based on the above experimental system, the tracer particle premixing heating tank resistant to high temperature and high pressure is used in this embodiment to store the tracer particle cluster and suspension of the working medium corresponding to the fluid in the reaction pipeline. The tracer particle premixing heating tank continuously stirs the suspension to ensure uniform mixing of the tracer particle cluster and the working medium, so as to maintain a stable mixing state and preheat the mixture to an inlet temperature of the target pipeline. The suspension is preheat to the same temperature as the fluid, and the three-way solenoid valve is used to rapid fill the tracer particle cluster and the suspension into the target pipeline, realizing filling of the tracer particles under high temperature and high pressure, while avoiding the influence of extra flow on the flow heat transfer law.

Visualization experimental sections, that is, visualization devices, are provided at the front and rear ends of the target pipeline and are used to coordinate high-speed cameras corresponding to the visualization devices at the front and rear ends of the target pipeline to perform synchronized high-frequency sampling, to obtain the first sampling image set and the second sampling image set.

Figure 3A:
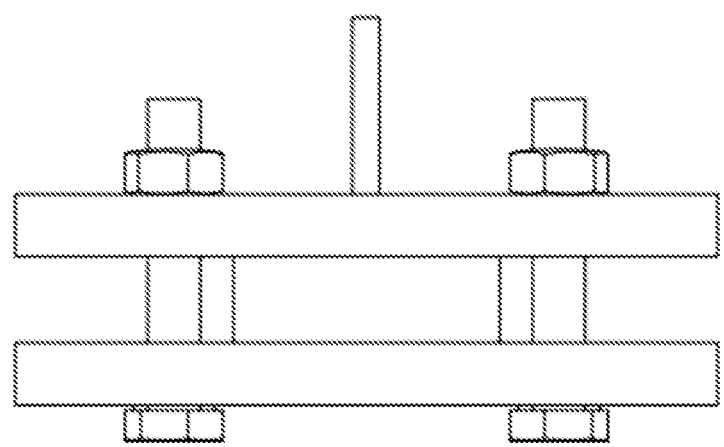
FIGS. 3A-C are schematic structural diagrams of a visualization device in a fluid measuring method according to an embodiment of this application.
Figure 3B:
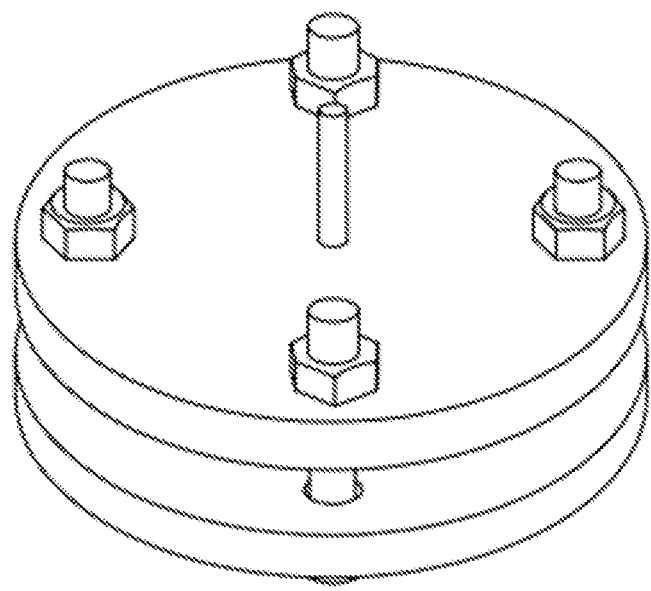
Figure 3C:
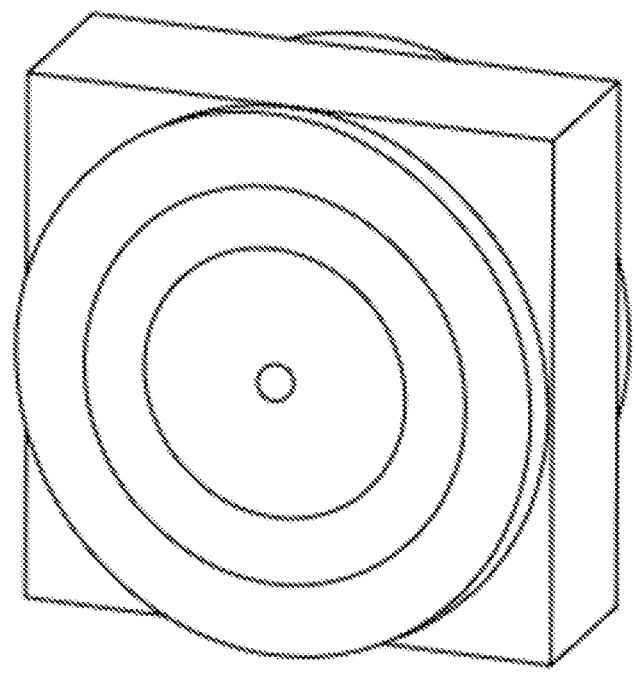

It should be noted that in the embodiments of this application, the visualization devices are processed with $SiO_2$ to ensure temperature resistance, and sealing structures such as graphite gaskets and flanges are used to ensure pressure resistance. Specifically, as shown in FIGS. 3A-C, the visualization devices adopt an outer-square, inner-circle structure, the outer square structure is used to eliminate refraction on the outer wall surface of the visualization device, and the inner round structure is consistent with the structure and size of the target pipeline, to eliminate the interference of the visualization devices with the flow heat transfer.

S102: Obtain, based on the first sampling image set and the second sampling image set, passing time distribution information of the tracer particle cluster passing through the target pipeline.

In the step S102, the time distribution information may be the passing time probability distribution of the tracer particle cluster flowing through the reaction pipeline. Specifically, the number of tracer particles in a sampling cross-section in each frame of image may be obtained based on the images in the first sampling image set and the second sampling image set, so as to obtain the passing time distribution information of the tracer particle cluster passing the visualization devices at the front and rear ends of the target pipeline. Details are as follows:

$$E(t) = \frac{\overline{N_k}}{\sum_{j=1}^{k_{max}} \overline{N_j} \Delta t}, t = k\Delta t \quad (1)$$

$\overline{N_k}$ is the number of tracer particles in the kth frame of image, E(t) is a probability density function characterizing the passing time distribution, and $\Delta t$ is a time interval between two adjacent frames of images.

S103: Obtain a mean residence time of the fluid in the high pressure target pipeline based on the passing time distribution information.

In the step S103, the mean residence time is the residence time of the fluid flowing through the target pipeline. Specifically, the obtaining a mean residence time of the fluid in the high pressure target pipeline based on the passing time distribution information may include: obtaining a first mean passing moment of the tracer particle cluster passing the front end of the target pipeline based on the probability density function of the time distribution; obtaining a second mean passing moment of the tracer particle cluster passing the rear end of the target pipeline based on the probability density function of the passing time distribution; and calculating the mean residence time based on the first mean passing moment and the second mean passing moment. Details are as follows:

$$\tau_m = \Sigma E(t) \Delta t \quad (2)$$

$$\Delta \tau_m = \tau_{m\text{-}out} - \tau_{m\text{-}in} \quad (3)$$

In the equation (3), $\tau_{m\text{-}in}$ and $\tau_{m\text{-}out}$ are the mean passing moments of the tracer particle cluster passing the front and rear ends of the target pipeline, and $\Delta \tau_m$ is the mean residence time of the fluid in the target pipeline.

The above is a specific implementation of the fluid measuring method according to the embodiments of this application. According to the embodiments of this application, when the fluid flows in the target pipeline, the high-speed camera obtains the first sampling image set of the tracer particle cluster in the fluid passing the front end of the target pipeline and the second sampling image set of the tracer particle cluster passing the rear end of the target pipeline, thereby obtaining the passing time distribution information of the tracer particle cluster passing through the target pipeline. The mean residence time of the fluid in the high-pressure target pipeline is obtained based on the passing time distribution information. In this way, the accuracy of non-intrusive online measurement of the mean residence time of the supercritical pressure fluid in the pipeline is ensured.

This application adopts high-temperature and high-pressure resistant tracer particles and visualization devices to achieve non-intrusive and online experimental measurement of the mean residence time of the fluid in the pipeline under high-temperature and high-pressure conditions, avoiding interference to the flow field caused by the existing intrusive experimental methods and breaking the limitation that the existing non-intrusive experimental methods can hardly be applied under high-temperature conditions. Since the mean residence time is not estimated by using a thermal property database or model in this application, the errors in calculating the mean residence time caused by using the corresponding database or model in the existing numerical research methods can be avoided.

Figure 4:
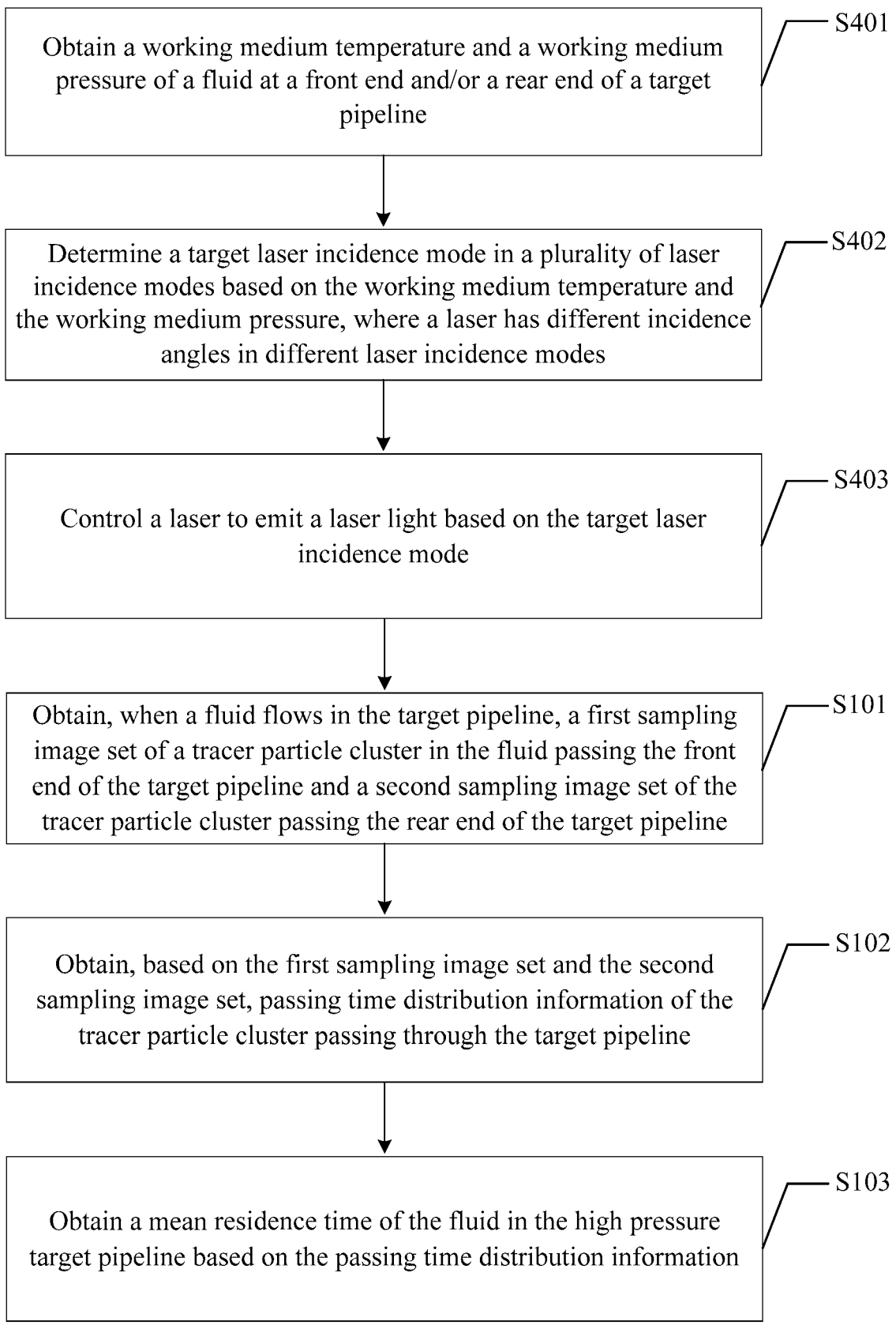
FIG. 4 is another schematic flowchart of a fluid measuring method according to an embodiment of this application.

In another implementation of this application, the signal-to-noise ratio of the particle image is low when the working medium in the target pipeline has a density increasing or decreasing greatly. In this case, it is necessary to determine a target laser incidence mode, to obtain the accurate number of the tracer particles. As shown in FIG. 4, before the step S101, the method may further include the following steps:

S401: Obtain a working medium temperature and a working medium pressure of the fluid at the front end and/or the rear end of the target pipeline.

In the step S401, the working medium temperature is the temperature of the working medium corresponding to the measured fluid at the front end and/or rear end of the target pipeline, and the working medium pressure is the pressure of the working medium corresponding to the measured fluid at the front end and/or rear end of the target pipeline, temperature detection components and pressure detection components are provided at the front end and the rear end of the target pipeline, the temperature detection components may be thermal resistors or a thermocouples, and the pressure detection components may be pressure sensors.

S402: Determine a target laser incidence mode in a plurality of laser incidence modes based on the working medium temperature and the working medium pressure, where a laser has different incidence angles in different laser incidence modes.

In the step S402, laser incidence is used to excite the tracer particle cluster to scatter and form a visual sampling cross-section, and the plurality of laser incidence modes may form a plurality of sampling cross-sections.

The target laser incidence mode may be determined in the plurality of laser incidence modes based on the working medium temperature and the working medium pressure.

Figure 5:
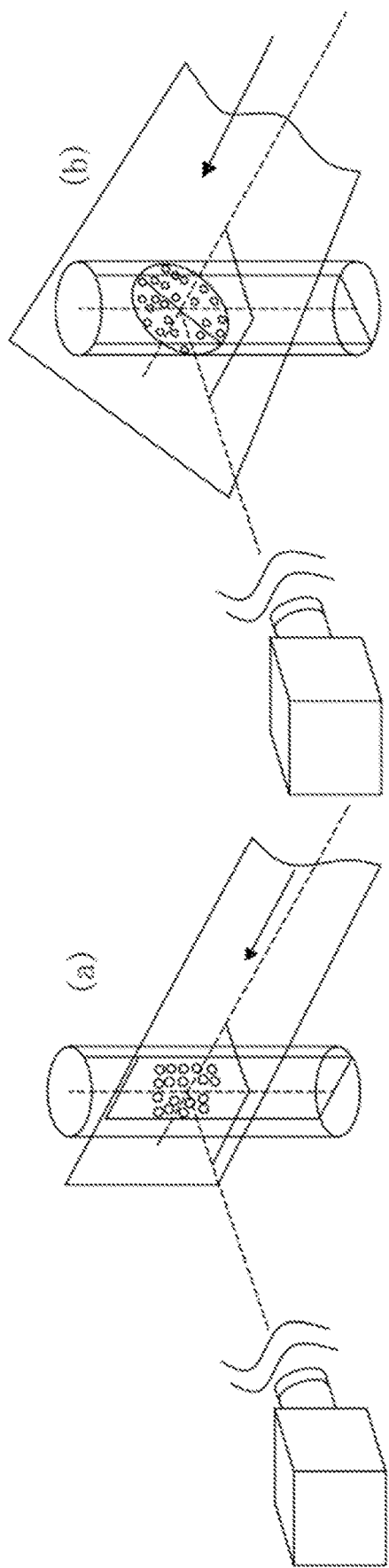
FIG. 5 is a schematic diagram of a laser normal incidence mode and a laser oblique incidence mode in a measuring method according to an embodiment of this application.

For example, FIG. 5 is a schematic diagram of a laser normal incidence mode and a laser oblique incidence mode used in an embodiment of the fluid measuring method. The determining a target laser incidence mode in a plurality of laser incidence modes based on the working medium temperature and the working medium pressure may include: determining that the target laser incidence mode is the laser normal incidence mode when the working medium temperature satisfies a pseudo-critical temperature corresponding to the working medium pressure, where an incidence direction of the laser in the laser normal incidence mode is perpendicular to a central axis of the target pipeline; or determining that the target laser incidence mode is the laser oblique incidence mode when the working medium temperature does not satisfy a pseudo-critical temperature corresponding to the working medium pressure, where an incidence direction of the laser in the laser oblique incidence mode has an inclination angle with a central axis of the target pipeline. It should be noted that the critical temperature depends on the working medium of the experimental fluid, may be set based on specific conditions of the experimental fluid, and is not limited to a fixed temperature.

S403: Control the laser to emit a laser light based on the target laser incidence mode.

In the step S403, images in the first sampling image set and the second sampling image set are images obtained when the laser excites the tracer particle cluster to scatter. In this embodiment, a laser emitting thin laser light is used to excite the tracer particles to scatter and form the sampling cross-sections. Preferably, a thin continuous laser with a wavelength of 532 nm and a thickness of 120 µm is used.

Certainly, the laser is not limited to this specification, and another laser may be correspondingly selected based on the actual experimental needs.

In this embodiment, the working medium temperature and the working medium pressure at the front end and/or rear end of the target pipeline are used to analyze whether the density of the working medium increases or decreases sharply, so as to determine the target laser incidence mode of the laser and obtain the accurate number of the tracer particles.

Figure 6:
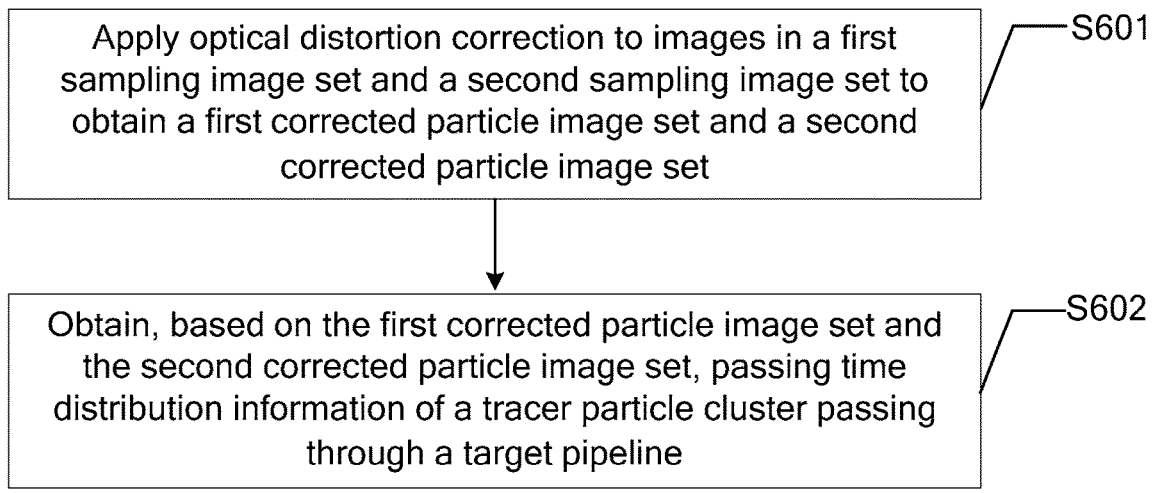
FIG. 6 is another schematic flowchart of a fluid measuring method according to an embodiment of this application.

In the embodiment shown in FIG. 4, when the target laser incidence mode is the laser normal incidence mode, as shown in FIG. 6, the step S102 may include the following steps:

S601: Apply optical distortion correction to the images in the first sampling image set and the second sampling image set to obtain a first corrected particle image set and a second corrected particle image set.

In the step S601, optical distortion correction is to correct optical distortions of the images caused by drastic changes in fluid physical properties, and the images in the first sampling image set and the second sampling image set need to be corrected to obtain the first corrected particle image set and the second corrected particle image set. The laser oblique incidence mode may be used when there is no significant increase or decrease in the density, to obtain particle images with lower signal-to-noise ratios. In this case, the number of the tracer particles in the images obtained based on the laser oblique incidence mode does not need to be corrected. The laser normal incidence mode may be used when there is significant increase or decrease in the density, and the obtained particle images have higher signal-to-noise ratios. In this case, the number of tracer particles needs to be corrected.

S602: Obtain, based on the first corrected particle image set and the second corrected particle image set, the passing time distribution information of the tracer particle cluster passing through the target pipeline.

In this embodiment, when the laser normal incidence mode is used, optical distortion correction is performed on the images with severe changes in physical properties, to obtain an accurate number of the tracer particles, so as to measure the mean residence time of the fluid with severe changes in physical properties in the target pipeline.

Figure 7:
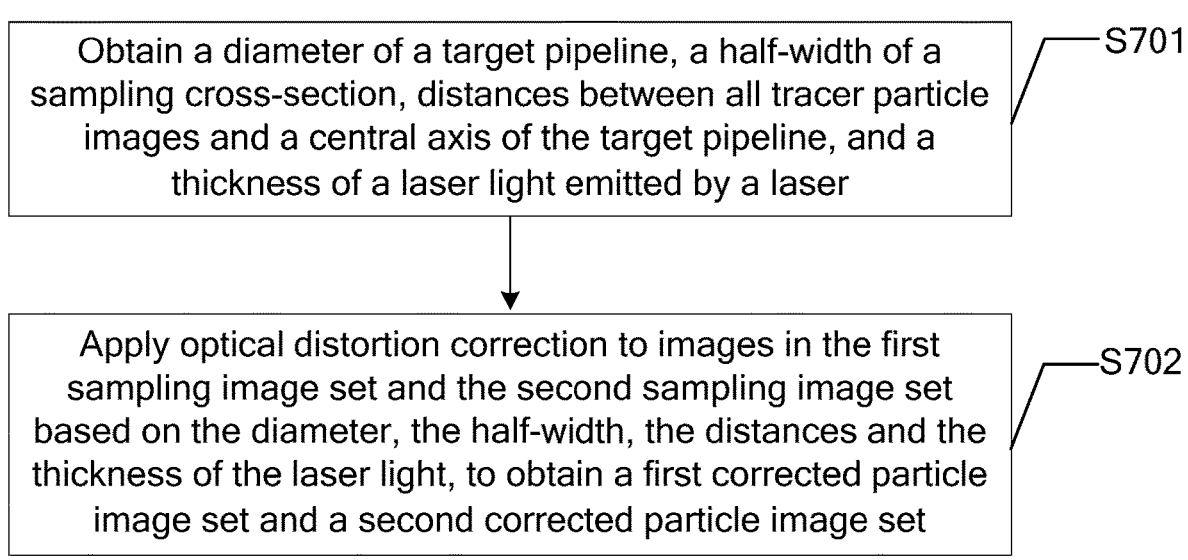
FIG. 7 is another schematic flowchart of a fluid measuring method according to an embodiment of this application.

In the embodiment shown in FIG. 6, the step S601 of applying optical distortion correction to the images in the first sampling image set and the second sampling image set to obtain a first corrected particle image set and a second corrected particle image set may specifically include the following steps as shown in FIG. 7:

S701: Obtain a diameter of the target pipeline, a half-width of a sampling cross-section, distances between all tracer particle images and the central axis of the target pipeline, and a thickness of the laser light emitted by the laser.

Figure 8A:
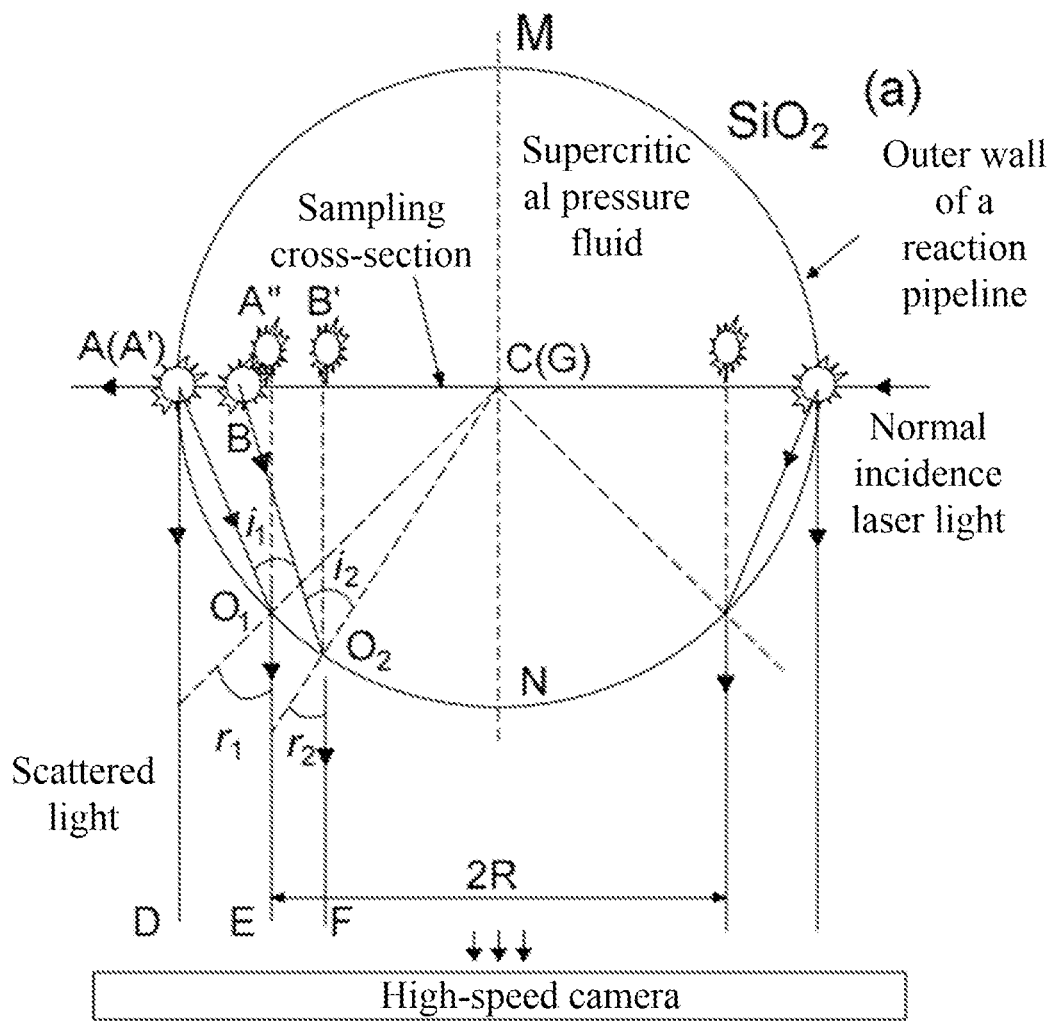
FIGS. 8A-B are schematic diagrams of optical distortion in a laser normal incidence mode in a fluid measuring method according to an embodiment of this application.
Figure 8B:
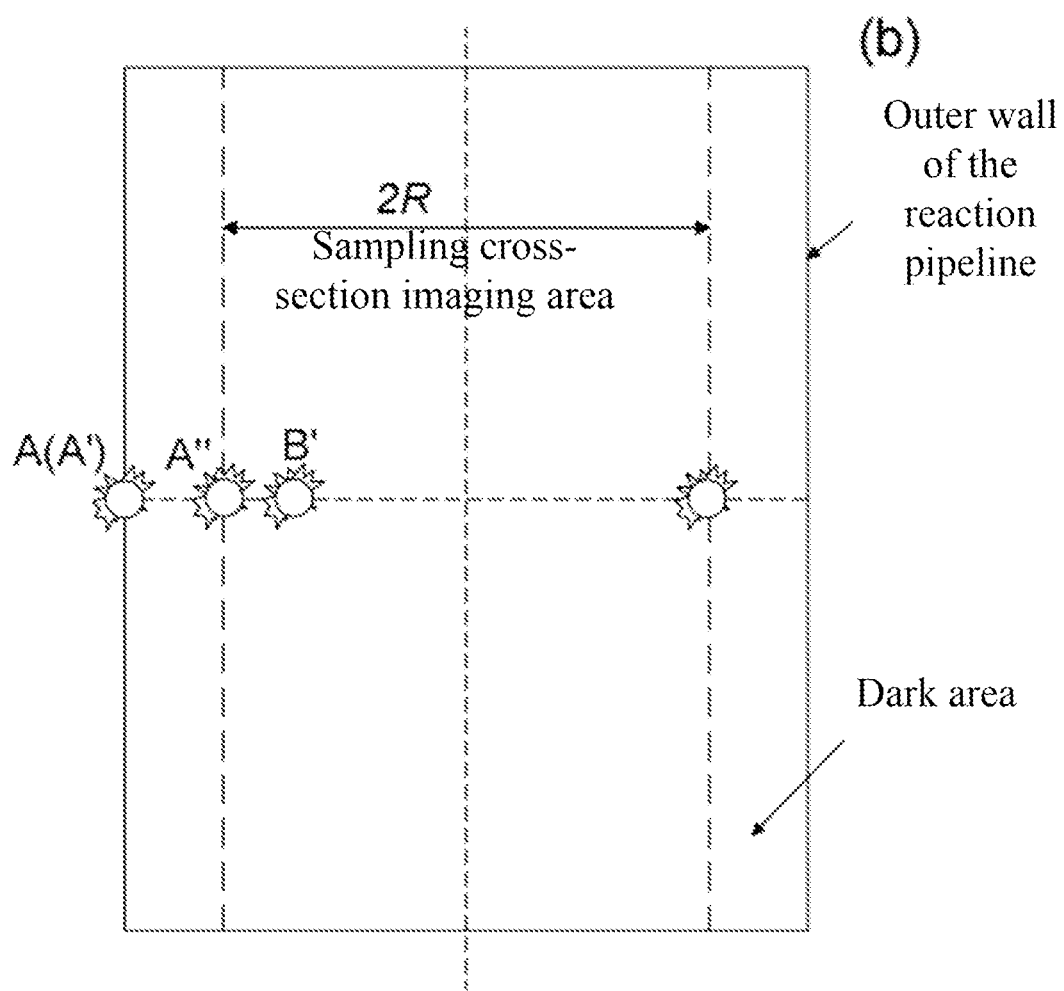

In the step S701, for example, FIGS. 8A-B are schematic diagrams of optical distortion in the laser normal incidence mode used in an embodiment of a fluid measuring method. For example, a particle in the images in the first sampling image set and the second sampling image set obtained based on the laser normal incidence mode is numbered q, D is the diameter of the target pipeline, R is the half-width of the sampling cross-section narrowed by the optical distortion, $x_q$ is a distance between the image of the particle q and the central axis of the target pipeline, and w is the thickness of the thin laser light emitted by the laser.

S702: Apply optical distortion correction to the images in the first sampling image set and the second sampling image set based on the diameter, the half-width, the distances and the thickness of the laser light, to obtain the first corrected particle image set and the second corrected particle image set.

In the step S702, the optical distortion correction applied is as follows:

$$x_{qe} = \frac{x_q D}{2R} \tag{4}$$

$$e_q = \frac{w}{\pi x_{qc}} \tag{5}$$

$$N_{kc} = \sum_{q=1}^{N_k} \frac{1}{e_q} \tag{6}$$

$x_{qc}$ is an actual distance between the object point of the particle q and the central axis of the target pipeline after correction; $e_q$ is a correction coefficient for correcting the radial distribution unevenness of the tracer particle q; $N_{kc}$ is the corrected total number of the tracer particles in the visualization device corresponding to the sampling cross-section.

In order to accurately obtain the number of the tracer particles, the images in the sampling image sets need to be processed. In an alternative implementation of this application, another implementation of the fluid measuring method is further provided. Details are as follows.

Figure 9:
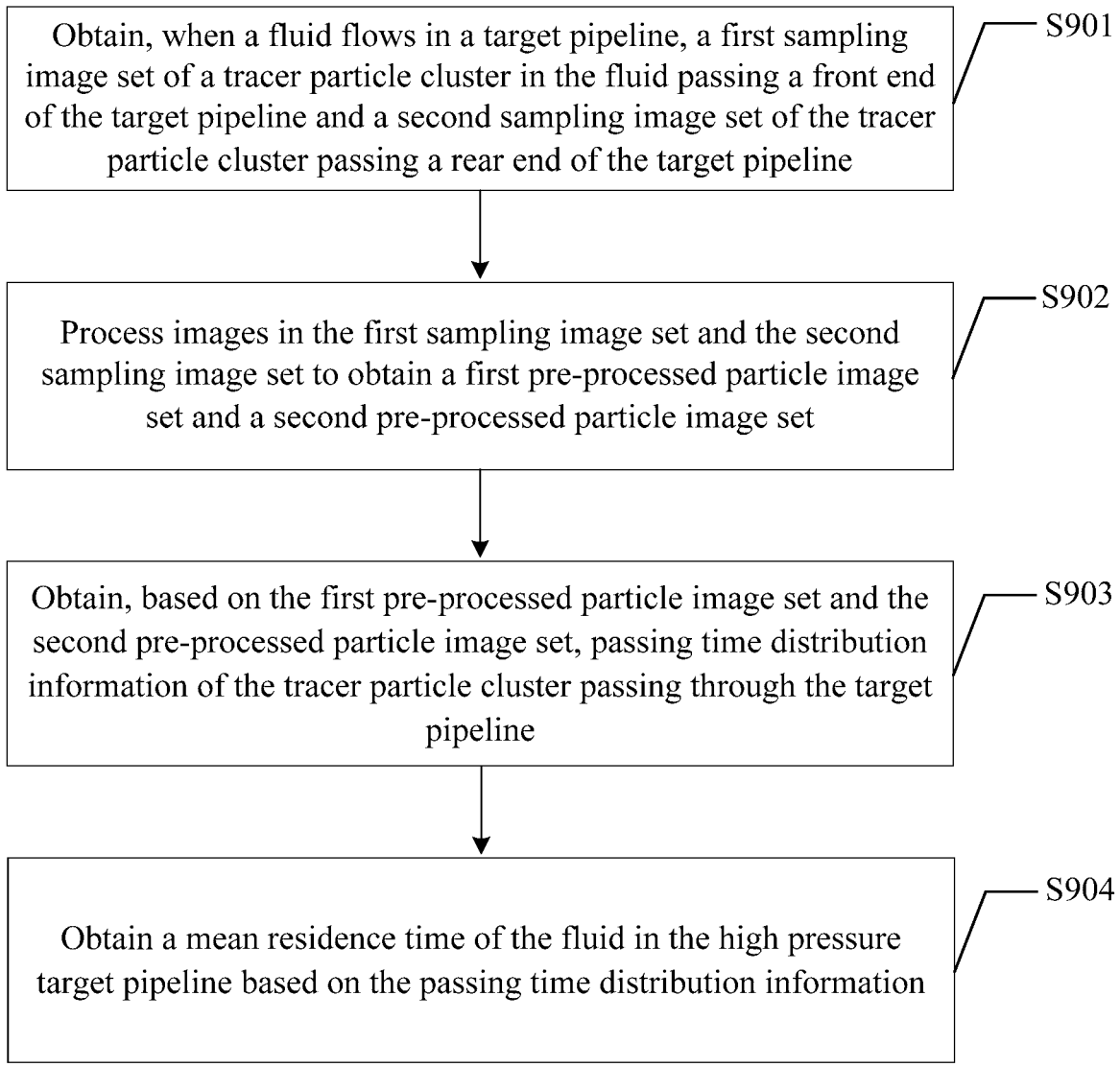
FIG. 9 is another schematic flowchart of a fluid measuring method according to an embodiment of this application.

Referring to FIG. 9, another implementation of the fluid measuring method provided in this application includes the following steps:

S901: Obtain, when a fluid flows in a target pipeline, a first sampling image set of a tracer particle cluster in the fluid passing a front end of the target pipeline and a second sampling image set of the tracer particle cluster passing a rear end of the target pipeline.

The step S901 is the same as the step S101 in the above embodiment, and is not described in detail herein for the sake of brevity.

S902: Process images in the first sampling image set and the second sampling image set to obtain a first pre-processed particle image set and a second pre-processed particle image set.

In the step S902, the images in the obtained first sampling image set and second sampling image set are grayscale images, on which at least one of boundary removal, noise reduction filtering and binarization may be performed.

S903: Obtain, based on the first pre-processed particle image set and the second pre-processed particle image set, passing time distribution information of the tracer particle cluster passing through the target pipeline.

The step S903 is the same as the S102 in the above embodiment, and is not described in detail herein for the sake of brevity.

S904: Obtain a mean residence time of the fluid in the high pressure target pipeline based on the passing time distribution information.

The step S904 is the same as the step S103 in the above embodiment, and is not described in detail herein for the sake of brevity.

In this embodiment, at least one of boundary removal, noise reduction filtering and binarization is performed on the images in the first sampling image set and the second sampling image set, to improve accuracy of obtaining the number of the tracer particles.

Figure 10:
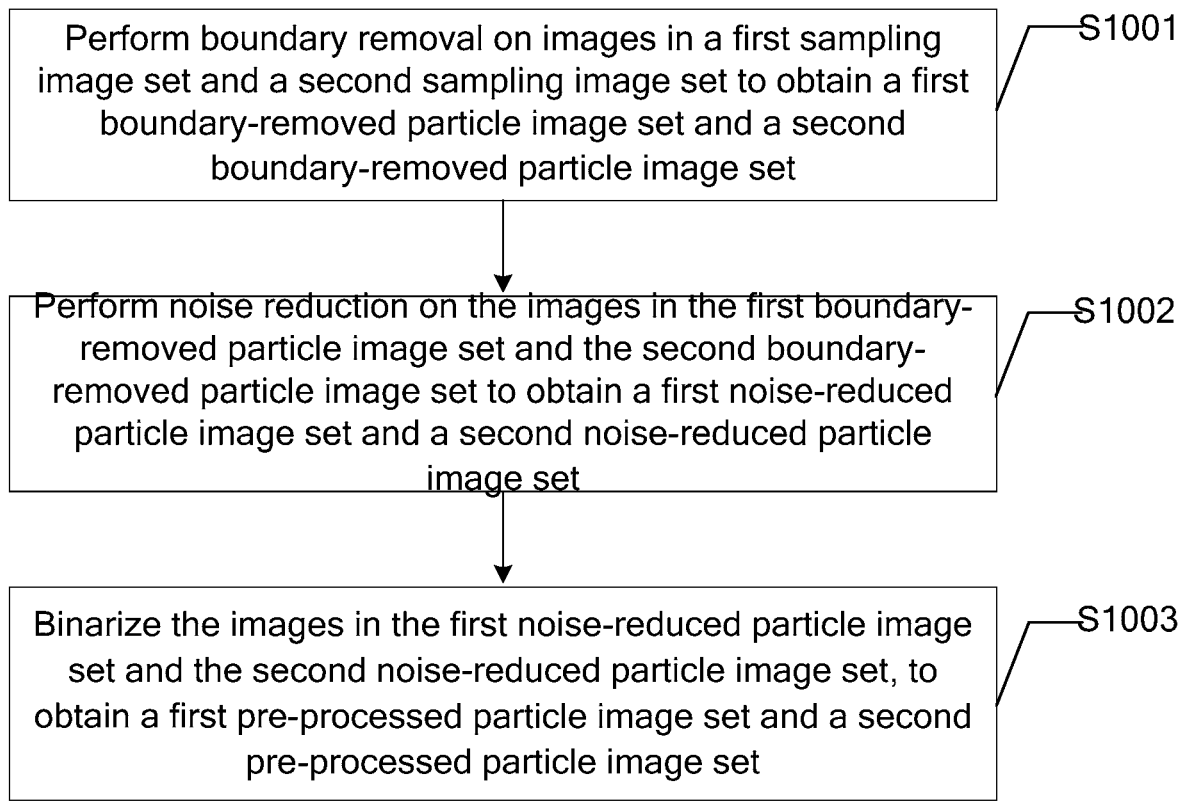
FIG. 10 is another schematic flowchart of a fluid measuring method according to an embodiment of this application.

In the embodiment shown in FIG. 9, the step S902 of processing images in the first sampling image set and the second sampling image set to obtain a first pre-processed particle image set and a second pre-processed particle image set includes the following steps as shown in FIG. 10:

S1001: Perform boundary removal on the images in the first sampling image set and the second sampling image set to obtain a first boundary-removed particle image set and a second boundary-removed particle image set.

S1002: Perform noise reduction on the images in the first boundary-removed particle image set and the second boundary-removed particle image set to obtain a first noise-reduced particle image set and a second noise-reduced particle image set.

S1003: Binarize the images in the first noise-reduced particle image set and the second noise-reduced particle image set, to obtain the first pre-processed particle image set and the second pre-processed particle image set.

In this embodiment, firstly, boundary areas of the images in the first sampling image set and the second sampling image set are delineated, and the boundary areas are removed, to avoid the influence of boundary signals on the particle counting; secondly, the particle images are subjected to noise reduction processing and a grayscale threshold is set to filter the images, so as to remove the background noise in the images; finally, the particle images after noise reduction are binarized, and the tracer particles in the images are counted based on the binarization result, so as to improve the accuracy of obtaining the number of the tracer particles.

Figure 11:
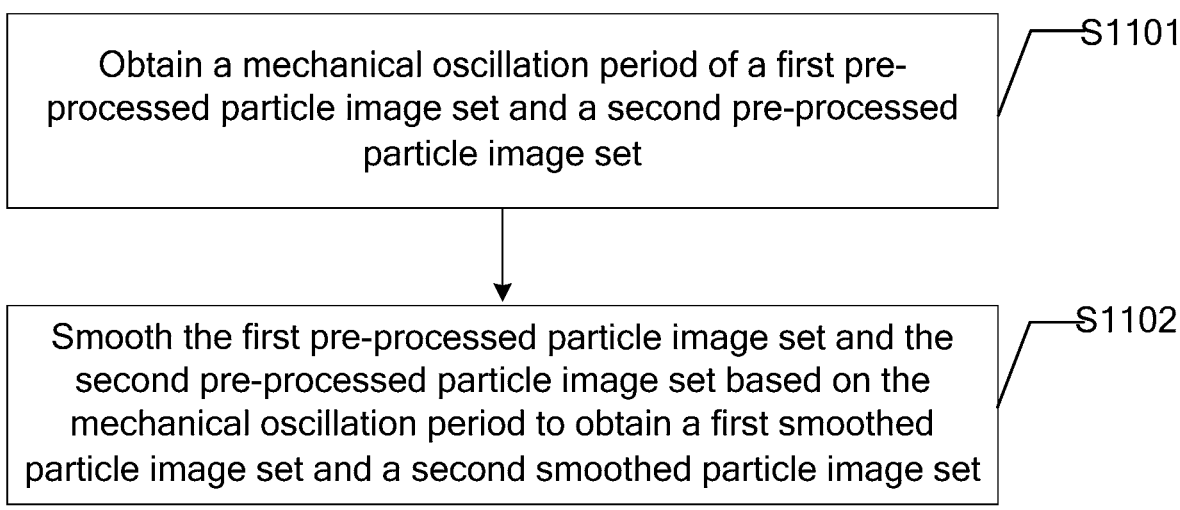
FIG. 11 is another schematic flowchart of a fluid measuring method according to an embodiment of this application.

In an example, in the embodiment shown in FIG. 10, after the step S1003 of binarizing the images in the first noise-reduced particle image set and the second noise-reduced particle image set, to obtain the first pre-processed particle image set and the second pre-processed particle image set, as shown in FIG. 11, the method may further include the following steps:

S1101: Obtain a mechanical oscillation period of the first pre-processed particle image set and the second pre-processed particle image set.

S1102: Smooth the first pre-processed particle image set and the second pre-processed particle image set based on the mechanical oscillation period to obtain a first smoothed particle image set and a second smoothed particle image set.

In this embodiment, mechanical vibration exists in the experimental system of the fluid measuring method, and therefore the number of tracer particles obtained after image processing fluctuates periodically. In order to facilitate statistical calculation of the mean residence time, the number of the tracer particles may be smoothed based on the mechanical vibration period.

Based on the fluid measuring method provided in the above embodiments, accordingly, this application further provides a specific implementation of a fluid measuring device.

Details are described in the following embodiment.

Figure 12:
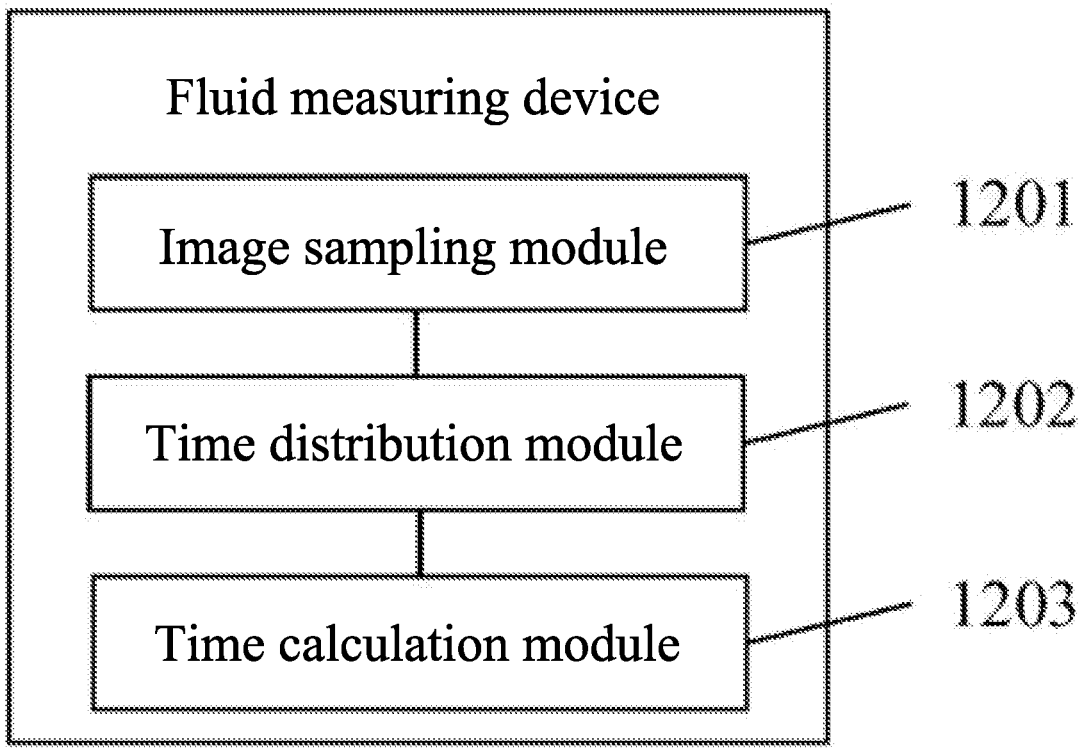
FIG. 12 is a schematic structural diagram of a fluid measuring device according to an embodiment of this application.

Referring to FIG. 12, the fluid measuring device according to this embodiment of this application includes the following units:

an image sampling module 1201 configured to obtain, when a fluid flows in a target pipeline, a first sampling image set of a tracer particle cluster in the fluid passing a front end of the target pipeline and a second sampling image set of the tracer particle cluster passing a rear end of the target pipeline;

a time distribution module 1202 configured to obtain, based on the first sampling image set and the second sampling image set, passing time distribution information of the tracer particle cluster passing through the target pipeline; and a time calculation module 1203 configured to obtain a mean residence time of the fluid in the high pressure target pipeline based on the passing time distribution information.

According to this embodiment, the image sampling module 1201 can obtain, through high-speed cameras when the fluid flows in the target pipeline, the first sampling image set of the tracer particle cluster in the fluid passing the front end of the target pipeline and the second sampling image set of the tracer particle cluster passing the rear end of the target pipeline, the time distribution module 1202 obtains the passing time distribution information of the tracer particle cluster passing through the target pipeline. The time calculation module 1203 obtains the mean residence time of the fluid in the high-pressure target pipeline based on the passing time distribution information. In this way, the accuracy of non-intrusive online measurement of the mean residence time of the supercritical pressure fluid in the pipeline is ensured.

In some implementations, the device may further include:

a laser incidence control module configured to obtain a working medium temperature and a working medium pressure of the fluid at the front end and/or rear end of the target pipeline.

The laser incidence control module is further configured to determine a target laser incidence mode in a plurality laser incidence modes based on the working medium temperature and the working medium pressure, where a laser has different incidence angles in different laser incidence modes.

The laser incidence control module is further configured to control the laser to emit a laser light based on the target laser incidence mode.

Images in the first sampling image set and the second sampling image set are images obtained when the laser excites the tracer particle cluster to scatter.

In this implementation, the working medium temperature and the working medium pressure at the front end and/or rear end of the target pipeline are used to analyze whether the density of the working medium increases or decreases sharply, so as to determine the target laser incidence mode of the laser and obtain the accurate number of the tracer particles.

In some implementations, the laser incidence control module is specifically configured to:

determine that the target laser incidence mode is a laser normal incidence mode when the working medium temperature satisfies a pseudo-critical temperature corresponding to the working medium pressure, where an incidence direction of the laser in the laser normal incidence mode is perpendicular to a central axis of the target pipeline; or determine that the target laser incidence mode is a laser oblique incidence mode when the working medium temperature does not satisfy a pseudo-critical temperature corresponding to the working medium pressure, where an incidence direction of the laser in the laser oblique incidence mode has an inclination angle with a central axis of the target pipeline.

In this implementation, it should be noted that the critical temperature depends on the working medium of the experimental fluid, may be set based on specific conditions of the experimental fluid, and is not limited to a fixed temperature.

In some implementations, when the target laser incidence mode is the laser normal incidence mode, the time distribution module may include:
- an optical distortion correction unit configured to apply optical distortion correction to the images in the first sampling image set and the second sampling image set to obtain a first corrected particle image set and a second corrected particle image set; and
- a time distribution unit configured to obtain, based on the first corrected particle image set and the second corrected particle image set, the passing time distribution information of the tracer particle cluster passing through the target pipeline.

In this implementation, when the laser normal incidence mode is used, optical distortion correction is performed on the images with severe changes in physical properties, to obtain an accurate number of the tracer particles, so as to measure the mean residence time of the fluid with severe changes in physical properties in the target pipeline.

In some implementations, the optical distortion correction unit may include:
- an acquisition subunit configured to obtain a diameter of the target pipeline, a half-width of a sampling cross-section, distances between all tracer particle images and the central axis of the target pipeline, and a thickness of the laser light emitted by the laser; and
- a correction subunit configured to apply optical distortion correction to the images in the first sampling image set and the second sampling image set based on the diameter, the half-width, the distances and the thickness of the laser light, to obtain the first corrected particle image set and the second corrected particle image set.

In this implementation, the optical distortions of the images caused by drastic changes in physical properties of the supercritical pressure fluid are corrected, and thus the number of the tracer particles in a sampling cross-section in each frame of image is obtained.

In some implementations, the device may further include:
- an image processing module configured to process the images in the first sampling image set and the second sampling image set to obtain a first pre-processed particle image set and a second pre-processed particle image set.
- the time distribution module is further configured to obtain, based on the first pre-processed particle image set and the second pre-processed particle image set, the passing time distribution information of the tracer particle cluster passing through the target pipeline.

In this implementation, at least one of boundary removal, noise reduction filtering and binarization is performed on the images in the first sampling image set and the second sampling image set, to improve accuracy of obtaining the number of the tracer particles.

In some implementations, the image processing module may include:
- a boundary removal unit configured to perform boundary removal on the images in the first sampling image set and the second sampling image set to obtain a first boundary-removed particle image set and a second boundary-removed particle image set;
- a noise reduction unit configured to perform noise reduction on the images in the first boundary-removed particle image set and the second boundary-removed particle image set to obtain a first noise-reduced particle image set and a second noise-reduced particle image set; and
- a binarization unit configured to binarize the images in the first noise-reduced particle image set and the second noise-reduced particle image set to obtain the first pre-processed particle image set and the second pre-processed particle image set.

In this implementation, firstly, boundary areas of the images in the first sampling image set and the second sampling image set are delineated, and the boundary areas are removed, to avoid the influence of boundary signals on the particle counting; secondly, the particle images are subjected to noise reduction processing and a grayscale threshold is set to filter the images, so as to remove the background noise in the images; finally, the particle images after noise reduction are binarized, and the tracer particles in the images are counted based on the binarization result, so as to improve the accuracy of obtaining the number of the tracer particles.

In some implementations, the device may further include:
- a smoothing processing module configured to obtain mechanical oscillation period of the first pre-processed particle image set and the second pre-processed particle image set.

The smoothing processing module may be further configured to smooth the first pre-processed particle image set and the second pre-processed particle image set based on the mechanical oscillation period to obtain a first smoothed particle image set and a second smoothed particle image set.

In this implementation, mechanical oscillation exists in the experimental system of the fluid measuring method, and therefore the number of the tracer particles obtained after image processing fluctuates periodically. In order to facilitate statistical calculation of the mean residence time, the number of the tracer particles can be smoothed based on the mechanical vibration period.

In some implementations, the time calculation module may be further configured to obtain a first mean passing moment of the front end of the target pipeline based the passing time distribution information;
- the time calculation module may be further configured to obtain a second mean passing moment of the rear end of the target pipeline based on the passing time distribution information; and
- the time calculation module may be further configured to calculate the mean residence time based on the first mean passing moment and the second mean passing moment.

In this implementation, the first mean passing moment and the second mean passing moment of the tracer particle cluster in the fluid passing the front and rear ends of the target pipeline are obtained through calculation, thus realizing non-intrusive and online measurement of the mean residence time of the fluid in the pipeline.

Figure 13:
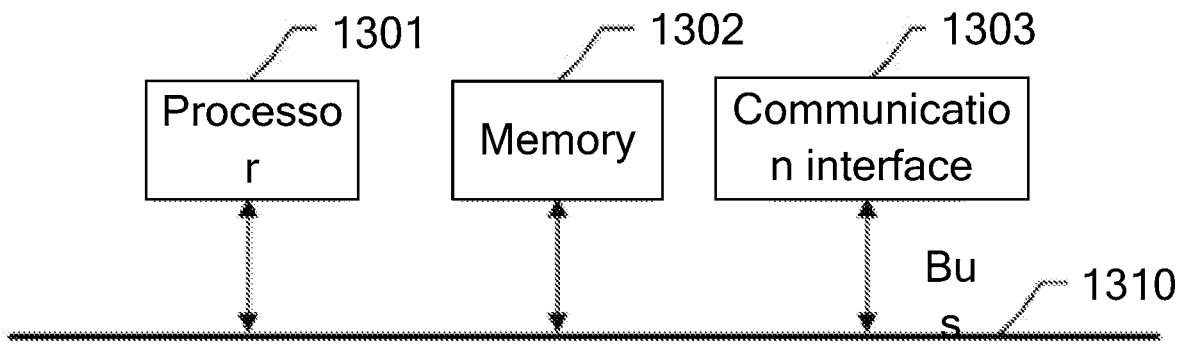
FIG. 13 is a schematic structural diagram of electronic equipment according to an embodiment of this application.

FIG. 13 is a schematic structural diagram of hardware of electronic equipment according to an embodiment of this application.

Specifically, the electronic equipment may include a processor 1301 and a memory 1302 storing computer program instructions.

Specifically, the processor 1301 may include a central processing unit (CPU) or an Application Specific Integrated Circuit (ASIC), or may be configured as one or more integrated circuits for implementing the embodiments of this application.

The memory 1302 may include a mass memory for data or instructions. By way of example but not limitation, the memory 1302 may include a hard disk drive (HDD), a floppy disk drive, a flash memory, an optical disk, a magnetic disk, a magnetic tape, or a universal serial bus (USB) drive, or a combination of two or more of these. If appropriate, the memory 1302 may include a removable or non-removable (or fixed) medium. If appropriate, the memory 1302 may be inside or outside of an integrated gateway disaster recovery device. In a specific embodiment, the memory 1302 may be a nonvolatile solid-state memory.

In a specific embodiment, the memory 1302 may include a read-only memory (ROM), a random access memory (RAM), a disk storage media device, an optical storage media device, a flash memory device, or an electrical, optical, or another physical/tangible memory storage device. Thus, typically, the memory 1302 includes one or more tangible (non-transitory) computer-readable storage media (for example, a memory device) encoded with software that includes computer-executable instructions. When the software is executed (for example, by one or more processors), the operations described with reference to the method according to an aspect of the present disclosure may be performed.

The processor 1301 reads and executes the computer program instructions stored in the memory 1302, to implement the fluid measuring method according to any of the embodiments.

In an example, the electronic equipment may further include a communication interface 1303 and a bus 1310. As shown in FIG. 13, the processor 1301, the memory 1302 and the communication interface 1303 are connected through the bus 1310 to complete mutual communication.

The communication interface 1303 is mainly configured to implement the communication between the modules, devices, units, and/or equipment in the embodiments of this application.

The bus 1310 includes hardware, software, or both, to couple the components of the electronic equipment to each other. By way of example but not limitation, the bus may include an accelerated graphics port (AGP) or another graphics bus, an extended industry standard architecture (EISA) bus, a front-side bus (FSB), a hypertransport (HT) interconnect, an industry standard architecture (ISA) bus, an InfiniBand interconnect, a low pin count (LPC) bus, a memory bus, a microchannel architecture (MCA) bus, a peripheral component interconnect (PCI) bus, a PCI-Express (PCI-X) bus, a Serial Advanced Technology Attachment (SATA) bus, a Video Electronics Standards Association local bus (VLB), or another suitable bus or a combination of two or more of these. If appropriate, the bus 1310 may include one or more buses. Although specific buses are described and illustrated in the embodiments of this application, any suitable bus or interconnect may be used in this application.

The electronic equipment may perform the fluid measuring method according to the embodiments of this application under complex operating conditions, thereby implementing the fluid measuring method described in combination with FIG. 1 to FIG. 11.

In addition, an embodiment of this application may provide a computer-readable storage medium to implement the fluid measuring method in the foregoing embodiments. The storage medium stores computer program instructions. When the computer program instructions are executed by a processor, any fluid measuring method in the foregoing embodiments is implemented.

Another embodiment of this application further provides a computer program product. When instructions in the computer program product are executed by a processor of electronic equipment, the electronic equipment performs the fluid measuring method according to any of the above embodiments.

It is to be clear that this application is not limited to the particular configuration and processing described above and illustrated in the accompanying drawings. A detailed description of the known method is omitted herein for the sake of brevity. In the above embodiments, several specific steps are described and illustrated as examples. However, the method of this application is not limited to the specific steps described and illustrated, and a person skilled in the art may make various changes, modifications and additions, or change the step sequence based on the spirit of this application.

The functional blocks shown in the structural block diagrams described above may be implemented as hardware, software, firmware, or a combination thereof. When implemented in hardware, the functional block may be, for example, an electronic circuit, an ASIC, appropriate firmware, a plug-in, a function card, or the like. When implemented in software, the elements of this application are programs or code segments that are used to perform the required task. The program or code segment may be stored in a machine-readable medium or transmitted on a transmission medium or communication link via a data signal carried in a carrier wave. A "machine-readable medium" may include any medium capable of storing or transmitting information. Examples of the machine-readable medium include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and the like. The code segment may be downloaded via computer networks such as the Internet or Intranets.

It is also noted that the exemplary embodiments mentioned in this application describe some methods or systems based on a series of steps or devices. However, this application is not limited to the above step sequence, that is, the steps may be performed in the sequence in the embodiments or in a sequence different from the sequence in the embodiments, or several steps may be performed simultaneously.

Various aspects of the present disclosure are described with reference to flowcharts and/or block diagrams of methods, devices, computer-readable storage media and computer program products according to embodiments of the present disclosure. It should be understood that each block of the flowcharts and/or block diagrams, and combinations of blocks in the flowcharts and/or block diagrams, can be implemented by the computer program instructions. The compute program instructions can be provided to a processor of a general-purpose computer, a dedicated computer, or other programmable data processing device, to produce a machine that makes the instruction when executed by the processor of the computer or other programmable data processing devices to implement the functions/actions specified in one or more blocks in the flowcharts and/or block diagrams. Such a processor may be, but is not limited to, a general purpose processor, an application specific processor, or a field programmable logic circuit. It should also be noted that each block in the flowcharts and/or block diagrams and combinations of the blocks in the flowcharts and/or block diagrams may be implemented by dedicated hardware for executing specified functions or operations, or may be implemented by a combination of dedicated hardware and computer instructions.

The foregoing descriptions are merely specific implementations of this application. A person skilled in the art can clearly understand that, for convenience and brevity of description, reference may be made to corresponding processes in the foregoing method embodiments for specific working processes of the foregoing systems, apparatuses, and units. Details are not described herein again. It should be understood that the protection scope of this application is not limited herein. Any equivalent modification or replacement readily figured out by a person skilled in the art within the technical scope disclosed in the present invention shall fall within the protection scope of the present invention.

What is claimed is:

1. A method for measuring fluid in a target pipeline, comprising:
obtaining a working medium temperature and a working medium pressure of the fluid at a front end and/or a rear end of the target pipeline;
determining a target laser incidence mode in a plurality of laser incidence modes based on the working medium temperature and the working medium pressure, wherein a laser has different incidence angles in different laser incidence modes;
controlling the laser to emit a laser light based on the target laser incidence mode;
obtaining, when the fluid flows in the target pipeline, a first sampling image set of a tracer particle cluster in the fluid passing the front end of the target pipeline and a second sampling image set of the tracer particle cluster passing the rear end of the target pipeline, wherein images in the first sampling image set and the second sampling image set are images obtained when the laser excites the tracer particle cluster to scatter;
obtaining, based on the first sampling image set and the second sampling image set, passing time distribution information of the tracer particle cluster passing through the target pipeline; and
obtaining a mean residence time of the fluid in the target pipeline based on the passing time distribution information.

2. The method according to claim 1, wherein the determining the target laser incidence mode in the plurality of laser incidence modes based on the working medium temperature and the working medium pressure comprises:
determining that the target laser incidence mode is a laser normal incidence mode when the working medium temperature satisfies a pseudo-critical temperature corresponding to the working medium pressure, wherein an incidence direction of the laser in the laser normal incidence mode is perpendicular to a central axis of the target pipeline; or
determining that the target laser incidence mode is a laser oblique incidence mode when the working medium temperature does not satisfy the pseudo-critical temperature corresponding to the working medium pressure, wherein the incidence direction of the laser in the laser oblique incidence mode has an inclination angle with the central axis of the target pipeline.

3. The method according to claim 2, wherein when the target laser incidence mode is the laser normal incidence mode,
the obtaining, based on the first sampling image set and the second sampling image set, passing time distribution information of the tracer particle cluster passing through the target pipeline comprises:
applying optical distortion correction to the images in the first sampling image set and the second sampling image set to obtain a first corrected particle image set and a second corrected particle image set; and
obtaining, based on the first corrected particle image set and the second corrected particle image set, the passing time distribution information of the tracer particle cluster passing through the target pipeline.

4. The method according to claim 3, wherein the applying optical distortion correction to the images in the first sampling image set and the second sampling image set to obtain the first corrected particle image set and the second corrected particle image set comprises:
obtaining a diameter of the target pipeline, a half-width of a sampling cross-section, distances between all tracer particle images and the central axis of the target pipeline, and a thickness of the laser light emitted by the laser; and
applying optical distortion correction to the images in the first sampling image set and the second sampling image set based on the diameter, the half-width, the distances and the thickness of the laser light, to obtain the first corrected particle image set and the second corrected particle image set.

5. The method according to claim 1, wherein before the obtaining, based on the first sampling image set and the second sampling image set, the passing time distribution information of the tracer particle cluster passing through the target pipeline, the method further comprises:
processing the images in the first sampling image set and the second sampling image set to obtain a first pre-processed particle image set and a second pre-processed particle image set; and
the obtaining, based on the first sampling image set and the second sampling image set, the passing time distribution information of the tracer particle cluster passing through the target pipeline comprises:
obtaining, based on the first pre-processed particle image set and the second pre-processed particle image set, the passing time distribution information of the tracer particle cluster passing through the target pipeline.

6. The method according to claim 5, wherein the processing the images in the first sampling image set and the second sampling image set to obtain a first pre-processed particle image set and a second pre-processed particle image set comprises:
performing boundary removal on the images in the first sampling image set and the second sampling image set to obtain a first boundary-removed particle image set and a second boundary-removed particle image set;
performing noise reduction on the images in the first boundary-removed particle image set and the second boundary-removed particle image set to obtain a first noise-reduced particle image set and a second noise-reduced particle image set; and
binarizing the images in the first noise-reduced particle image set and the second noise-reduced particle image set to obtain the first pre-processed particle image set and the second pre-processed particle image set.

7. The method according to claim 6, wherein after the binarizing the images in the first noise-reduced particle image set and the second noise-reduced particle image set to obtain the first pre-processed particle image set and the second pre-processed particle image set, the method further comprises:
obtaining a mechanical oscillation period of the first pre-processed particle image set and the second pre-processed particle image set; and
smoothing the first pre-processed particle image set and the second pre-processed particle image set based on the mechanical oscillation period to obtain a first smoothed particle image set and a second smoothed particle image set.

8. The method according to claim 1, wherein the obtaining a mean residence time of the fluid in the target pipeline based on the passing time distribution information comprises:
    obtaining a first mean passing moment of the front end of the target pipeline based on the passing time distribution information;
    obtaining a second mean passing moment of the rear end of the target pipeline based on the passing time distribution information; and
    calculating the mean residence time based on the first mean passing moment and the second mean passing moment.

9. A device for measuring fluid in a target pipeline, comprising:
    a laser incidence control unit configured to obtain a working medium temperature and a working medium pressure of the fluid at a front end and/or a rear end of the target pipeline, wherein the laser incidence control unit is further configured to determine a target laser incidence mode in a plurality of laser incidence modes based on the working medium temperature and the working medium pressure, wherein a laser has different incidence angles in different laser incidence modes; the laser incidence control unit is further configured to control the laser to emit a laser light based on the target laser incidence mode;
    an image sampling module configured to obtain, when the fluid flows in the target pipeline, a first sampling image set of a tracer particle cluster in the fluid passing the front end of the target pipeline and a second sampling image set of the tracer particle cluster passing the rear end of the target pipeline, wherein images in the first sampling image set and the second sampling image set are images obtained when the laser excites the tracer particle cluster to scatter;
    a time distribution module configured to obtain, based on the first sampling image set and the second sampling image set, passing time distribution information of the tracer particle cluster passing through the target pipeline; and
    a time calculation module configured to obtain a mean residence time of the fluid in the high pressure-target pipeline based on the passing time distribution information.

10. The device according to claim 9, wherein the laser incidence control module is specifically configured to:
    determine that the target laser incidence mode is a laser normal incidence mode when the working medium temperature satisfies a pseudo-critical temperature corresponding to the working medium pressure, wherein an incidence direction of the laser in the laser normal incidence mode is perpendicular to a central axis of the target pipeline; or
    determine that the target laser incidence mode is a laser oblique incidence mode when the working medium temperature does not satisfy the pseudo-critical temperature corresponding to the working medium pressure, wherein the incidence direction of the laser in the laser oblique incidence mode has an inclination angle with the central axis of the target pipeline.

11. The device according to claim 10, wherein when the target laser incidence mode is the laser normal incidence mode, the time distribution module comprises:
    an optical distortion correction unit configured to apply optical distortion correction to the images in the first sampling image set and the second sampling image set to obtain a first corrected particle image set and a second corrected particle image set; and
    a time distribution unit configured to obtain, based on the first corrected particle image set and the second corrected particle image set, the passing time distribution information of the tracer particle cluster passing through the target pipeline.

12. The device according to claim 11, wherein the optical distortion correction unit comprises:
    an acquisition subunit configured to obtain a diameter of the target pipeline, a half-width of a sampling cross-section, distances between all tracer particle images and the central axis of the target pipeline, and a thickness of the laser light emitted by the laser; and
    a correction subunit configured to apply optical distortion correction to the images in the first sampling image set and the second sampling image set based on the diameter, the half-width, the distances and the thickness of the laser light, to obtain the first corrected particle image set and the second corrected particle image set.

13. The device according to claim 9, further comprising:
    an image processing module configured to process the images in the first sampling image set and the second sampling image set to obtain a first pre-processed particle image set and a second pre-processed particle image set,
    wherein the time distribution module is further configured to obtain, based on the first pre-processed particle image set and the second pre-processed particle image set, the passing time distribution information of the tracer particle cluster passing through the target pipeline.

14. The device according to claim 13, wherein the image processing module is configured to:
    a boundary removal unit configured to perform boundary removal on the images in the first sampling image set and the second sampling image set to obtain a first boundary-removed particle image set and a second boundary-removed particle image set;
    a noise reduction unit configured to perform noise reduction on the images in the first boundary-removed particle image set and the second boundary-removed particle image set to obtain a first noise-reduced particle image set and a second noise-reduced particle image set; and
    a binarization unit configured to binarize the images in the first noise-reduced particle image set and the second noise-reduced particle image set to obtain the first pre-processed particle image set and the second pre-processed particle image set.

15. The device according to claim 14, further comprising:
    a smoothing processing module configured to obtain a mechanical oscillation period of the first pre-processed particle image set and the second pre-processed particle image set,
    wherein the smoothing processing module is further configured to smooth the first pre-processed particle image set and the second pre-processed particle image set based on the mechanical oscillation period to obtain a first smoothed particle image set and a second smoothed particle image set.

16. The device according to claim 9, wherein
the time calculation module is further configured to obtain a first mean passing moment of the front end of the target pipeline based on the passing time distribution information;
the time calculation module is further configured to obtain a second mean passing moment of the rear end of the target pipeline based on the passing time distribution information; and
the time calculation module is further configured to calculate the mean residence time based on the first mean passing moment and the second mean passing moment.

* * * * *